(12) United States Patent
Townsley et al.

(10) Patent No.: US 7,853,708 B2
(45) Date of Patent: Dec. 14, 2010

(54) TECHNIQUES FOR REPLACING POINT TO POINT PROTOCOL WITH DYNAMIC HOST CONFIGURATION PROTOCOL

(75) Inventors: William Mark Townsley, Nashville, TN (US); Vincent John Mammoliti, Mississauga (CA); Ralph Droms, Westford, MA (US); Wojciech Dec, Amsterdam (NL); Richard Pruss, Queensland (AU)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 11/362,702

(22) Filed: Feb. 25, 2006

(65) Prior Publication Data

US 2007/0203999 A1 Aug. 30, 2007

Related U.S. Application Data

(63) Continuation-in-part of application No. 11/362,296, filed on Feb. 24, 2006, and a continuation-in-part of application No. 11/362,703, filed on Feb. 25, 2006.

(51) Int. Cl.
*G06F 15/16* (2006.01)
*G06F 15/177* (2006.01)

(52) U.S. Cl. .................. 709/230; 709/207; 709/220

(58) Field of Classification Search .......... 709/207, 709/230
See application file for complete search history.

(56) References Cited

U.S. PATENT DOCUMENTS

| | | | |
|---|---|---|---|
| 6,092,110 | A | 7/2000 | Maria et al. |
| 6,286,039 | B1 | 9/2001 | Van Horne et al. |
| 7,082,535 | B1 | 7/2006 | Norman et al. |
| 7,342,906 | B1 | 3/2008 | Calhoun |

(Continued)

FOREIGN PATENT DOCUMENTS

KR 1020020077049 * 12/2002

(Continued)

OTHER PUBLICATIONS

Droms et al., RFC 4014—Remote Authentication Dial-In User Service (RADIUS) Attributes Suboption for the Dynamic Host Configuration Protocol (DHCP) Relay Agent Information Option, Feb. 2005, InternetL www.ietf.org, p. 1-8.*

(Continued)

*Primary Examiner*—Vivek Srivastava
*Assistant Examiner*—Taylor Elfervig
(74) *Attorney, Agent, or Firm*—Patent Capital Group

(57) ABSTRACT

Techniques for providing remote access to a service provider network include exchanging multiple Dynamic Host Configuration Protocol (DHCP) formatted messages instead of any Point to Point Protocol (PPP) message to provide all PPP functions for accessing a service provider network from a customer node. The service provider network is on provider premises and the customer node is on customer premises different from the provider premises. The DHCP format is used to exchange authentication messages, user profile data on Authentication, Authorization and Accounting (AAA) servers, or session keep-alive echo messages, alone or in some combination. When all are message types are combined, these techniques provide a remote access server (RAS) with the capability to perform all functions presently provided by PPP processes. In some combinations, these techniques allow a modified DHCP server to replace a legacy AAA server.

35 Claims, 8 Drawing Sheets

U.S. PATENT DOCUMENTS

| | | | |
|---|---|---|---|
| 7,461,251 | B2 | 12/2008 | Oishi |
| 7,568,040 | B2 | 7/2009 | Townsley et al. |
| 2002/0006133 | A1* | 1/2002 | Kakemizu et al. ............ 370/401 |
| 2002/0013844 | A1* | 1/2002 | Garrett et al. ................ 709/225 |
| 2002/0098840 | A1* | 7/2002 | Hanson et al. ............... 455/435 |
| 2003/0101243 | A1 | 5/2003 | Donahue et al. |
| 2003/0143973 | A1 | 7/2003 | Nagy et al. |
| 2004/0252693 | A1 | 12/2004 | Cheriton et al. |
| 2005/0105529 | A1* | 5/2005 | Arberg et al. ............. 370/395.5 |
| 2005/0286518 | A1 | 12/2005 | Park |
| 2006/0174324 | A1 | 8/2006 | Zur et al. |
| 2007/0180499 | A1 | 8/2007 | Van Bemmel |
| 2007/0204330 | A1 | 8/2007 | Townsley et al. |

FOREIGN PATENT DOCUMENTS

| | | |
|---|---|---|
| WO | WO 2005/104500 A1 * | 12/2004 |
| WO | WO 2007/098314 A2 | 8/2007 |

OTHER PUBLICATIONS

Congdon et al., RFC 3580—IEEE 802.1X Remote Authentication Dial In User Service (RADIUS) Usage Guidelines, Sep. 2003, InternetL www.ietf.org, p. 1-29.*

Patrick, RFC 3046—DHCP Relay Agent Information Option, Jan. 2001, Internet: www.ietf.org, p. 1-18.*

Droms, RFC 3118—Authentication for DHCP Messages, Jun. 2001, Internet: www.ietf.org, p. 1-22.*

Kivinen, "Using RADIUS backend for DHCP over IKE", Apr. 2003, Internet: www.ietf.org, p. 1-4.*

Droms, "RFC 2132—DHCP Options and BOOTP Vendor Extensions", Mar. 1997, Internet: ietf.org, p. 1-32.*

Simpson, W., PPP Challenge Handshake Authetnication Protocol (CHAP), www.ietf.org/rfc/rfc1994.txt, Aug. 1, 1996, pp. 12, Publisher: Internet Engineering Task Force, , Published in: Internet.

Patrick, M., DHCP Relay Agent Information Option, www.ietf.org/rfc/rfc3046.txt, Jan. 1, 2001, pp. 14, Publisher: Internet Engineering Task Force, Published in: Internet.

Droms, R., Authentication for DHCP Messages, www.ietf.org/rfc/rfc3118.txt, Jun. 1, 2001, pp. 17, Publisher: Internet Engineering Task Force, Published in: Internet.

Aboba et al., RFC 3748—Extensible Authentication Protocol (EAP), Jun. 2004, 67 pages.

Droms, "RFC 2131—Dynamic Host Configuration Protocol," Mar. 1997, Internet: ietf.org, 43 pages.

Droms, "RFC 2132—DHCP Options and BOOTP Vendor Extensions," Mar. 1997, Internet: ietf.org, 32 pages.

Rigney et al., RFC 2865—Remote Authentication Dial in User Service (RADIUS), Jun. 2000, 76 pages.

International Search Report (1 page) and Written Opinion of the International Searching Authority (3 pages) for International Application No. PCT/US07/61581 mailed Sep. 23, 2008.

International Preliminary Report on Patentability for International Application No. PCT/US07/61581 issued Oct. 14, 2008 (4 pages).

* cited by examiner

US 7,853,708 B2

TECHNIQUES FOR REPLACING POINT TO POINT PROTOCOL WITH DYNAMIC HOST CONFIGURATION PROTOCOL

CROSS-REFERENCE TO RELATED APPLICATIONS

This application claims benefit as a Continuation-in-part of application Ser. No. 11/462,296, filed Feb. 24, 2006 (hereinafter Townsley I) the entire contents of which are hereby incorporated by reference as if fully set forth herein, under 35 U.S.C. §120.

This application claims benefit as a Continuation-in-part of application Ser. No. 11/362,703, filed Feb. 25, 2006 (hereinafter Townsley II) the entire contents of which are hereby incorporated by reference as if fully set forth herein, under 35 U.S.C. §120.

BACKGROUND OF THE INVENTION

1. Field of the Invention

The present invention relates to migrating point to point protocol (PPP) functions for customer access of a wide area network to the Internet Protocol (IP).

2. Description of the Related Art

Networks of general purpose computer systems and special devices connected by external communication links are well known. The networks often include one or more network devices that facilitate the passage of information between the computer systems. A network node is a network device or computer system or special device connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The next protocol is said to be encapsulated in the particular protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information.

One such layer 2 protocol is the Point to Point Protocol (PPP) between a host computer on a local area network and a network node that provides access to a wide area network, such as the Internet. Some protocols, including PPP, pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications. For example, authentication information used to authenticate users and layer 3 address assignment information used by routers to direct data packets according to their layer 3 addresses are passed between nodes in PPP control messages in the PPP control plane.

PPP provides a standard method for transporting any of multiple protocol data packets (also called frames, datagrams and cells, and used interchangeably herein) over point-to-point links. PPP is defined in an Internet Engineering Task Force (IETF) request for comments document (RFC) numbered 1661, dated July 1994, the entire contents of which are hereby incorporated by reference as if fully set forth herein. Copies of RFC 1661 and other RFCs cited below are available at the World Wide Web domain ietf.org. PPP has been used extensively to connect users at a home site to a remote network using modems and telephone copper loop infrastructure. PPP provides a robust control plane for signaling line characteristics, network protocol parameters, and user-level authentication. In large service provider networks, the user authentication models are generally well entrenched, including, but not limited to, custom-built applications for communicating policy to network equipment and to track billing information.

For applications in which multiple hosts on a shared Ethernet establish PPP sessions to multiple destinations via one or more bridging modems, a PPP over Ethernet (PPPoE) specification has been developed. PPPoE is intended to be used with broadband remote access technologies that provide a bridged Ethernet topology, when access providers wish to distinguish different users connected via the same modem to the remote network. PPP provides this distinction by opening different sessions with different users. PPPoE is described in IETF RFC 2516, the entire contents of which are hereby incorporated by reference as if fully set forth herein. After establishing a PPP session, IP data packets are sent encapsulated in PPPoE.

There is a trend among network service providers to move to Ethernet and IP as the only layer two and layer three protocols between end nodes at a user site and end nodes on the remote network to which access is sought. One reason given for this trend is a desire to make use of IP-based quality of service (QoS) capabilities available in access network equipment. Another reason given is to reduce complexity because data packets can be transmitted from one portion of the network infrastructure to another without translating between layer 2 protocols. Another reason given is that using IP over Ethernet will improve the bandwidth utilization per transmitted frame due to a lower protocol overhead.

One approach is to eliminate PPP and PPPoE; and provide the PPP functions using IP-based functions. For example, it has been proposed to use International Electrical and Electronics Engineers standard 802.1x or web portal methods for authentication, and to use the Dynamic Host Configuration Protocol (DHCP) for assigning IP addresses. A justification offered for this approach is that, when all encapsulated data packets are IP, the multi-protocol encapsulation capability of PPP is not valuable.

There are some disadvantages to eliminating PPP. For example, web portal based authentication has drawbacks in that it requires a specific application (web browser) to be activated before anything can happen. The existing IP-based functions do not perform all the functions performed by PPP. Some of these protocols would have to be extended to perform the missing functions. For example, DHCP would have to be extended to perform user authentication and integration with an authorization server, configure link-level parameters such as maximum reception unit (MRU), and include a connection "keep-alive" mechanism, among other tasks, in order to encompass all of the functionality that PPP offers today.

In one approach, described in RFC 3118 on DHCP authentication, a mechanism is presented that is directed to authenticating the DHCP messages themselves to ensure that they did not get altered in transmit, rather than authenticating the user.

PPP provides a "keep-alive" mechanism for detecting when a session is active and available so that reallocation of an IP address or billing can take place on session termination. DHCP does not have any mechanism today apart from a lease timeout. In one approach, DHCP is used with very short lease times, e.g., as short as 5 seconds. A problem with this approach is that devices for users who engage in sessions that last longer than the lease time have to negotiate new leases with the DHCP server, increasing the consumption of network resources both in terms of traffic volume and computational time at a node that hosts a DHCP server.

Also, as pointed out above, especially in large service provider networks, PPP-based functions are generally well entrenched with provider-specific extensions. For example, some provider-specific extensions provide authorization to determine whether an authentic user is in good standing for receiving one or more services, e.g., for paid-up basic services, for voice services, or for a particular quality of service, or some combination. Many of these extensions involve a Broadband Remote Access Server (BRAS) hooking into an Authentication, Authorization, Accounting (AAA) server like the Remote Authentication Dial-In User Service (RADIUS) server. Neither RFC 3118 nor DHCP address determining whether an authentic user is actually authorized to access any particular services on the network or involve hooking into an AAA server. A wholesale replacement of general PPP functions with IP will not address any provider-specific extensions. Some transition period is needed to give the provider time to adapt the provider-specific extensions to the IP mechanisms.

Based on the foregoing, there is a clear need for techniques that migrate one or more PPP functions to IP over Ethernet infrastructure but that do not suffer all the disadvantages of the prior art approaches. In particular there is a need within DHCP to emulate PPP interactions with an AAA server. Furthermore, there is a need to entirely replace PPP functionality between customer premises nodes and a provider remote access server using DHCP.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus and system are described for migrating at least PPP interactions with AAA servers to DHCP. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In various embodiments described herein, techniques are provided that perform at least some PPP control plane functionality while utilizing DHCP, itself a purely control plane protocol. In the following description, embodiments are described primarily in the context of migrating the non-authentication PPP interactions with an AAA server at a BRAS to DHCP by defining new DHCP processes and DHCP option types. However, the invention is not limited to these embodiments. In other embodiments, the interactions with AAA are performed using DHCP at other network nodes, including other remote access servers and subscriber aware services gateways and end nodes. In some illustrated embodiments, the DHCP options for non-authentication AAA interactions are combined with DHCP authentication and DHCP keep-alive mechanisms to completely replace PPP for remote access to a provider IP network.

DHCP is based on a client-server model of network communications, well known and widely used in the art. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, redundancy, or other advantages, or some combination.

According to the DHCP client server model, a DHCP client operating on a device communicates with one or more DHCP servers to obtain configuration information, including an IP address for the client's host device.

1.0 Network Overview

Figure 1:
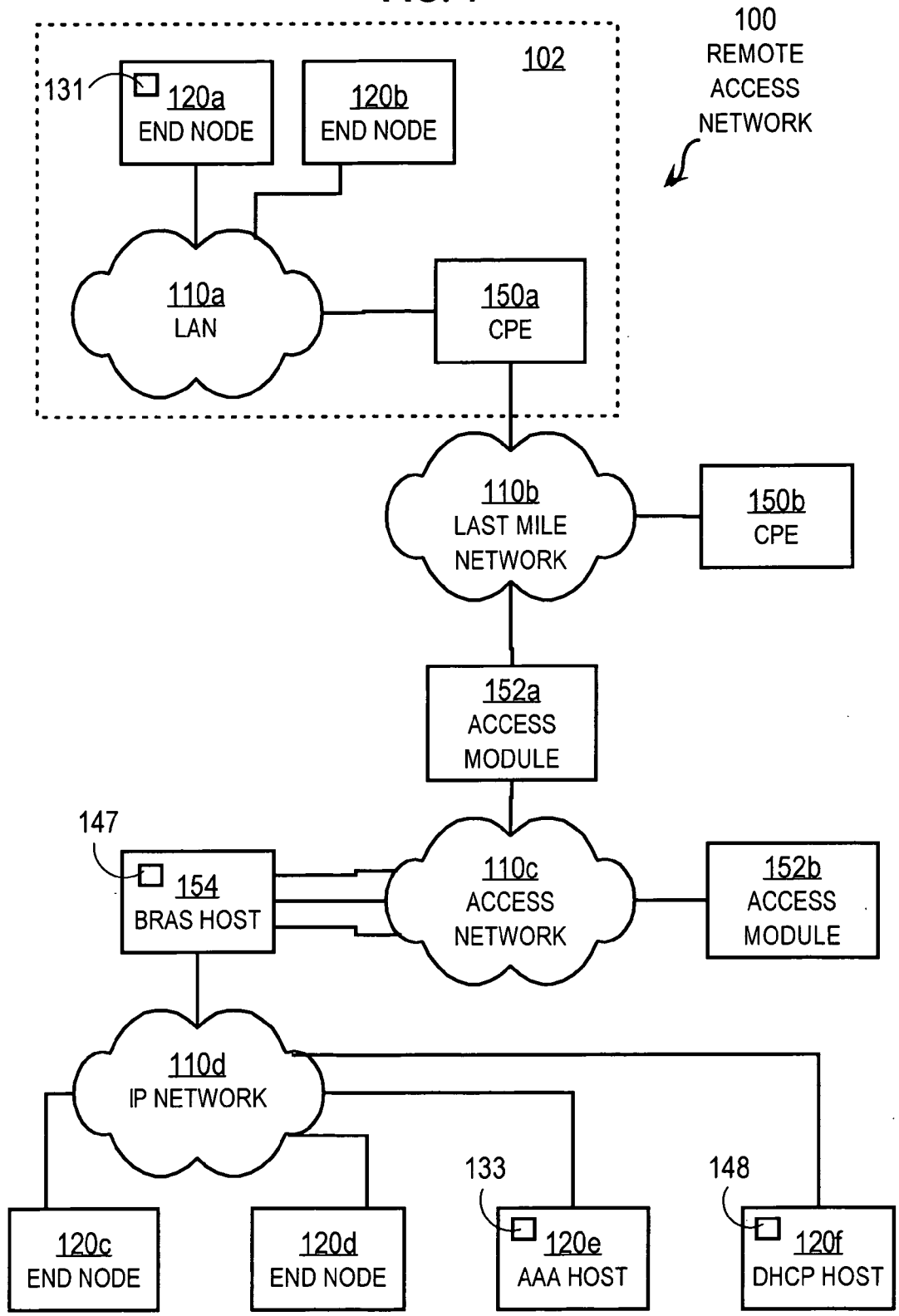
FIG. 1 is a block diagram that illustrates a remote access network, according to an embodiment.

FIG. 1 is a block diagram that illustrates a remote access network 100, according to an embodiment. A computer network is a geographically distributed collection of interconnected sub-networks (e.g., sub-networks 110a, 110b, 110c, 110d collectively referenced hereinafter as sub-networks 110) for transporting data between nodes, such as computers, video content sources and television set boxes. A local area network (LAN) 110a is an example of such a sub-network. The network's topology is defined by an arrangement of end nodes (e.g., end nodes 120a, 120b, 120c, 120d, 120e, 120f collectively referenced hereinafter as end nodes 120) that communicate with one another, typically through one or more intermediate network nodes, such as a router or switch, that facilitate routing data between end nodes 120 on different sub-networks. As used herein, an end node 120 is a node that is configured to originate or terminate communications over the network. End nodes 120 include an Authentication, Authorization, Accounting (AAA) server host 120e, and a DHCP server host 120f.

In contrast, an intermediate network node facilitates the passage of data between end nodes. Intermediate network nodes depicted in FIG. 1 include customer premises equipment (CPE) 150a, 150b, access modules 152a, 152b, and Broadband Remote Access Server (BRAS) node 154.

Four sub-networks 110 that are typically involved in remote access are depicted in FIG. 1. Each sub-network 110 may includes zero or more intermediate network nodes. An IP network 110d is the target network (also called a "core" network) for remote access by users at a remote site 102.

To access IP network 110d, a LAN 110a is connected to CPE 150a which serves as a bridge to a network 110b called the last mile network. The last mile network 110b is built on a telephone wire infrastructure, such as dial-up or digital subscriber line (DSL), or cable television infrastructure, either coaxial cable or optical fiber, or a wireless infrastructure, such as WiFi (IEEE standard 802.11). It is anticipated that other technologies for the last mile network 110b will develop over time. In an illustrated embodiment, LAN 110a uses Ethernet infrastructure. Although the remote site 102 includes an Ethernet LAN 110a and two end nodes 120a, 120b, in other embodiments more or fewer end nodes 120 are connected to more or fewer or different LANs 110, such as one or more LANs using Asynchronous Transfer Mode (ATM) infrastructure. In some cases, CPE is a telephone modem using acoustic signals over a low-bandwidth legacy telephone system. In an illustrated embodiment, CPE 150a is a digital subscriber line (DSL) modem for establishing a high bandwidth DSL connection over the telephone wire as last mile network 110b. In some embodiments, CPE 150a is a combined router and end node, such as a cable television set-top box and LAN 110a and end nodes 120a, 120b are omitted.

Communications over sub-network 110b from CPE 150a, 150b terminate at access module 152a. Although two CPEs 150a, 150b are depicted connected to sub-network 110b, in other embodiments more or fewer CPEs are connected to sub-network 110b. In an illustrated embodiment, access module 152a is a DSL Access Module (DSLAM). In other embodiments, access module 152a is a controller for a bank of low-bandwidth modems or a cable or optical access module.

An internet service provider (ISP) typically maintains or leases portions of several access modules 152a, 152b and an access network 110c for connection to the IP network 110d (also called a "core" network) through a Broadband Remote Access Server (BRAS) host 154. In many current embodiments, the access network 110c is migrating to an Ethernet infrastructure that supports the Internet Protocol (IP).

According to various embodiments of the invention, a DHCP client 131 executes at end node 120a, a legacy AAA server 133 executes at AAA host 120e, and modified DHCP processes 147, 148 execute on BRAS host 154 or DHCP host 134, respectively, or both, or some other node on IP network 110d or access network 110c.

2.0 Structural Elements

Figure 2:
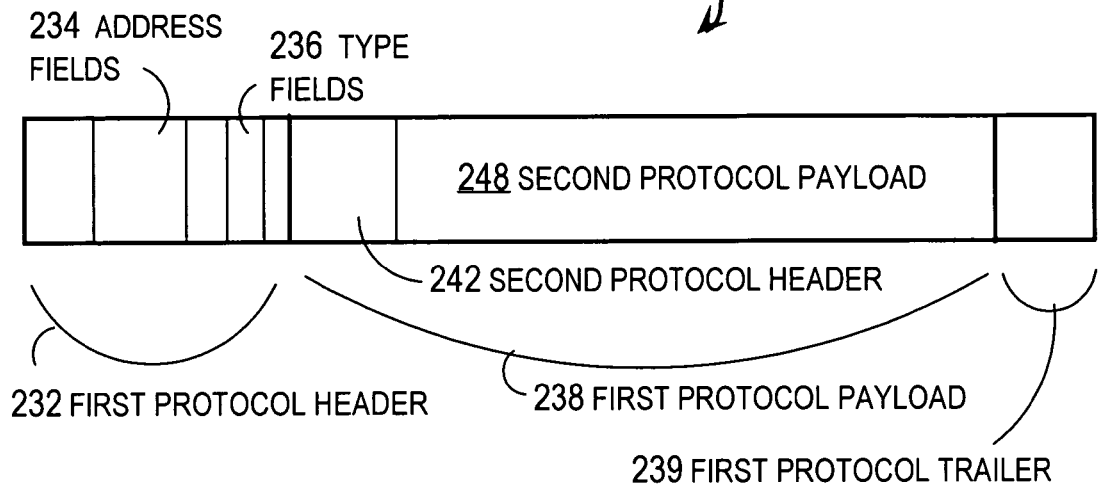
FIG. 2 is a block diagram that illustrates a packet of data communicated over a network.

FIG. 2 is a block diagram that illustrates a generalized data packet 230 communicated over a network, such as network 100. Each packet typically comprises one or more payloads of data, e.g. payloads 238, 248, each encapsulated by at least one network header, e.g., headers 232, 242, respectively. For example, payloads are encapsulated by appending a header before the payload, sometimes called prepending a header, and sometimes by appending a trailer (or tail) after the payload. Each header 232, 242 is formatted in accordance with a network communication protocol; header 232 is formatted according to a first protocol and header 242 is formatted according to a second protocol. The header 242 for the second protocol is included within the payload 238 of the first protocol. As used herein, a header for a particular protocol and its payload constitute a data packet for that protocol and may also be called a cell, frame, datagram or message for that protocol. In some publications data packets for different protocols are distinguished in shorthand by using a different one of the above terms for different protocols, e.g., to refer to Ethernet frames and IP datagrams, but here the terms are used interchangeably.

The header for a protocol typically includes type fields that identify the protocol to which the header belongs and the next protocol in the payload, if any. For example, the header 232 for the first protocol includes type fields 236. The header for a protocol often includes a destination address or a source address, or both, for the information in the payload. For example, the header 232 for the first protocol includes address fields 234 where the source and receiver address for the first protocol is located within the packet 230. As described above, a transmitted data packet's network headers include at least a physical link (layer 1) header and a data-link (layer 2) header.

The physical (layer 1) header defines the electrical, mechanical and procedural mechanisms for proper capture of the Ethernet frame, but is not captured by a Media Access Controller. The layer 1 header may include a DSL or ATM or Ethernet layer 1 header, or some combination.

The data-link header provides information for transmitting the packet over a particular physical link (i.e., a communication medium), such as a point-to-point link, Ethernet layer 2 link, wireless link, optical link, etc. An intermediate network node typically contains multiple physical links with multiple different nodes. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header is a layer 3 header that provides information defining the source and destination address within the interconnected sub-networks (internetwork). Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

DHCP is a control plane protocol that uses messages carried by the User Datagram Protocol (UDP) to transmit IP addresses and other configuration information used to set up IP as the layer 3 protocol, i.e., the internetwork protocol. UDP is a simple, small and fast layer 4 protocol without sophisticated error-tracking and sequencing mechanisms, which utilizes IP broadcasts as a layer 3 protocol to carry UDP messages with DHCP payloads. IP broadcasts do not rely on individual IP addresses for recipients, but direct data packets to all hosts on a particular network segment. A network segment is a collection of one or more communication links without an intervening intermediate network node. An IP broadcast is indicated by a special broadcast value in the IP destination address field of an IP header. A host without an IP address, such as the DHCP client's host at startup, can send an IP data packet by inserting a null address (e.g., 0.0.0.0) in the IP source address field of an IP header, and can receive IP broadcast data packets. DHCP agents are processes on intermediate network nodes that forward DHCP broadcasts and DHCP messages from null address sources received on one network segment to a different network segment, as desired.

Figure 3:
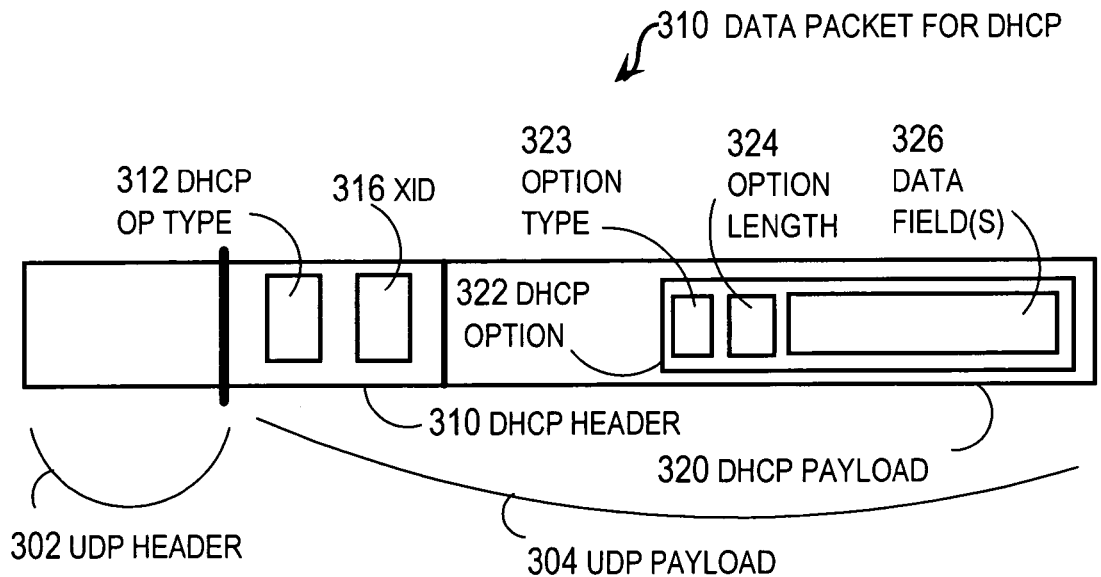
FIG. 3 is a block diagram that illustrates a DHCP packet of data communicated over a network.

FIG. 3 is a block diagram that illustrates a data packet 310 for a DHCP message communicated over a network. A DHCP message is carried inside a UDP payload 304 that follows the UDP header 302. The DHCP message includes a DHCP header 310 and a DHCP payload 320. According to the DHCP standard, described in RFC 2131 and RFC 2132 the entire contents of each of which are hereby incorporated by reference as if fully set forth herein, the DHCP header 310 includes an op type field 312 and an xid field 316. The DHCP header 310 also includes other fields that are not relevant to understanding embodiments of the invention. Data held in the DHCP op type field 312 indicates whether the message is sent by a DHCP client to a DHCP server, or is sent by a DHCP server to a DHCP client, as is well known in the art. Data held in the DHCP xid field 312 is usually used by a DHCP client to match incoming DHCP messages with pending DHCP requests for configuration data.

The DHCP payload 320 includes one or more required or optional fields, or both, depending on the message type indicated in a message type field in one DHCP option. A generic DHCP option field 322 is illustrated. The DHCP option field 322 includes an option type field 323 and option length field 324 and one or more data fields 326, depending on the option type expressed in the option type field 323. Data held in the option type field 323 indicates the type of option. Data held in the DHCP option length field 324 indicates the length of the DHCP option. Data held in the DHCP option data fields 326 indicates the values, or name-value pair of one or more attributes associated with the option type indicated in the option type field 323. One option carried in the DHCP payload contains an attribute that indicates the type of the DHCP message, such as a DHCPDISCOVER message or a DHCP OFFER message. Different values in the attribute field correspond to different message types. All of the message types are defined in RFC 2131, RFC 2132 and subsequent RFCs, well known in the art. A DHCP payload may carry multiple data options fields like option field 322.

Figure 4:
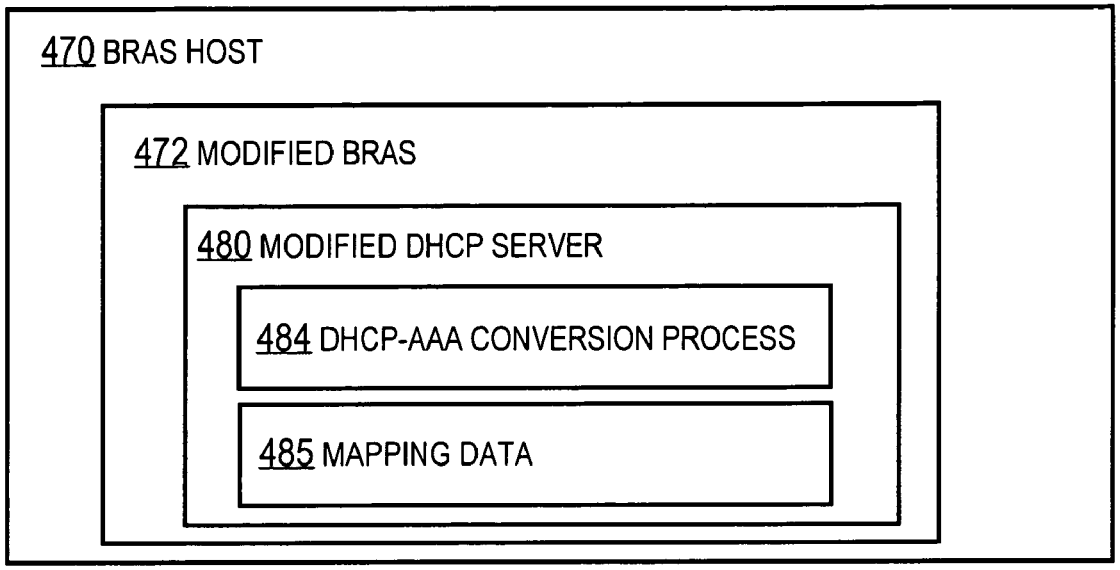
FIG. 4 is a block diagram that illustrates a BRAS host, according an embodiment.

FIG. 4 is a block diagram that illustrates a BRAS host 470, according to an embodiment. The BRAS host 470 includes a modified BRAS 472, a modified DHCP server 480 (such as modified DHCP process 147 on BRAS host 154), a DHCP-AAA conversion process 484, and a mapping data structure 485. The modified DHCP server 480 is modified from a standard DHCP server in order to engage DHCP-AAA conversion process 484. The DHCP-AAA conversion process 484 uses the data in the mapping data structure 485.

In other embodiments, DHCP server 480 or DHCP-AAA conversion process 484, or both, are external to modified BRAS 472 and interact with modified BRAS 472 through an API. In some embodiments, the modified DHCP server 480 executes on a different node, e.g., as modified DHCP process 146 on DHCP host 120f.

The mapping data structure 485 holds data that indicates an association between an AAA attribute used in BRAS interactions with an AAA server (for configuration data for remote access by a user through the BRAS) and a corresponding DHCP option. A well known AAA server is the Remote Authentication Dial-In User Service (RADIUS) server. Table 1 lists associations between RADIUS attributes and DHCP options according to an illustrated embodiment. In the illustrated embodiment, new DHCP options are included that should be added to the DHCP standard to correspond to AAA attributes currently used in interactions with a BRAS, or desired for use in the future. Although records and fields and data structures like 485 itself are depicted in FIG. 4 and other block diagrams as contiguous areas in a particular order for purposes of illustration, in other embodiments, one or more of the data structures, records and fields, or portions thereof, are stored in a different order or in different areas of storage on one or more devices, or in one or more databases. For example one or more portions of the data structure 485 are stored in a different order or in different areas of storage on one or more devices, or in one or more databases accessible to modified DHCP server 480.

TABLE 1

Mapping data for an illustrated embodiment (an asterisk indicates a new DHCP option type to be added to standard).

| RADIUS attribute | DHCP option type (data field) |
|---|---|
| Framed-IP-Address | yiaddr |
| Framed-IP-Netmask | subnet mask |
| NAS-Identifier | giaddr |
| Client-MAC-Address | chaddr |
| Client-Primary-DNS | DNS server |
| Client-Secondary-DNS | DNS server |
| MS-Primary-NBNS-Server | WINS/NBNS server |
| MS-Secondary-NBNS-Server | WINS/NBNS server |
| Client-Host-Name | hostname |
| Client-Domain-Name | domainname |
| DHCP-Lease-Time | lease |
| User-Name | *DHCPAUTH-Response (CHAP Name) |
| CHAP-Hash-Algorithm | *DHCPAUTH-Protocol |
| CHAP-Challenge | *DHCPAUTH-Challenge |
| CHAP-Response | *DHCPAUTH-Response |
| Access-Accept-Reply-Message | *DHCPAUTH-Success (Message) |
| Access-Reject-Reply-Message | *DHCPAUTH-Failure (Message) |
| Service-Type | *DHCPAAA-Service |
| NAS-Port-Type | *DHCPAAA-Port (Type) |
| NAS-Port | *DHCPAAA-Port (Number) |
| NAS-Port-ID | *DHCPAAA-Port (ID) |
| AV-Pair | *DHCPAAA-AVPair |
| ip:addr-pool | *DHCPAAA-AVPair (ip:addr-pool) |
| Access-Control-List | *DHCPAAA-ACL |

Table 1 includes new DHCP option types that are not in the DHCP standard at the time of this writing. Such DHCP option types are marked in Table 1 by an asterisk (*). The DHCP-AUTH option types are described in detail in Townsley I. The DHCPAAA option types are defined here to map the RADIUS attributes formerly used during a typical configuration step at a BRAS using PPP. Service indicates a service to be provided the client, such as the level of quality of service or a virtual private network service to be made available for the client host. NAS is the network access server that is communicating with the AAA server on behalf of the client host, and the NAS port indicates the physical port and protocol stack used for communication between the NAS and the RADIUS server. An option type is indicated by a unique value in an option type field 323 of a DHCP option field 322. Some option types indicate multiple values are included in the data fields 326. For example, in Table 1, option type DHCPAAA-Port includes three values in the data fields 326, a Type value, a Number value, and an ID field. The DHCP standard is modified to define a field length for each of these values. The field size for each of these values is easily determined by inspection and experimentation. For example, in an illustrated embodiment, the Type field is 61 octets, the Number field is 5 octets and the ID field is 87 octets. In other embodiments, more or fewer DHCP options are included. For example, in some embodiments Primary DNS Server maps to "DHCPAAA-Primary-DNS," Secondary DNS Server maps to "DHCPAAA-Secondary-DNS" and Subnet Mask maps to "DHCPAAA Subnet."

Table 1 also includes a DHCPAAA-AVPair option for holding one or more attribute-value pairs used in communications with an AAA server. As is well known in the art, an attribute value pair is a pair of fields in which one field gives a name of an attribute and a second field gives the value; the lengths of these fields in determined in a fixed header part of the AVP structure. In the illustrated embodiment, the DHC-PAAA-AVPair option holds data for an IP address pool to be used for assigning an IP address to the client.

DNS refers to a domain name server (DNS) which is an IP server that resolves names expressed as characters (e.g., CorpA.com) into IP addresses (e.g., 1.1.1.1). NBNS is a NetBios name server (NBNS) which is a different layer 3 protocol server that resolves names expressed as characters (e.g., Jim-Desktop), into NetBios addresses. A MS NBNS refers to Microsoft NetBios/NetBeui Name Server. WINS refers to a Microsoft Windows name server.

In other embodiments, more or fewer AAA attributes are mapped to DHCP options types in mapping data structure 485. For example, in some embodiments in which the modified DHCP server is at the BRAS, AAA attributes consumed at the BRAS and not forwarded to the DHCP client are not mapped to DHCP option. For example, the quality of service and access control list mapped to DHCPAAA-Service and DHCPAAA-ACL are used at the BRAS and not the client host and are not mapped in embodiments in which the modified DHCP server is at a BRAS In some embodiments, the mapping includes one or more translation functions to translate a value in an AAA attribute to a corresponding value in the associated DHCP option type, or to translate in the opposite direction.

Figure 6:
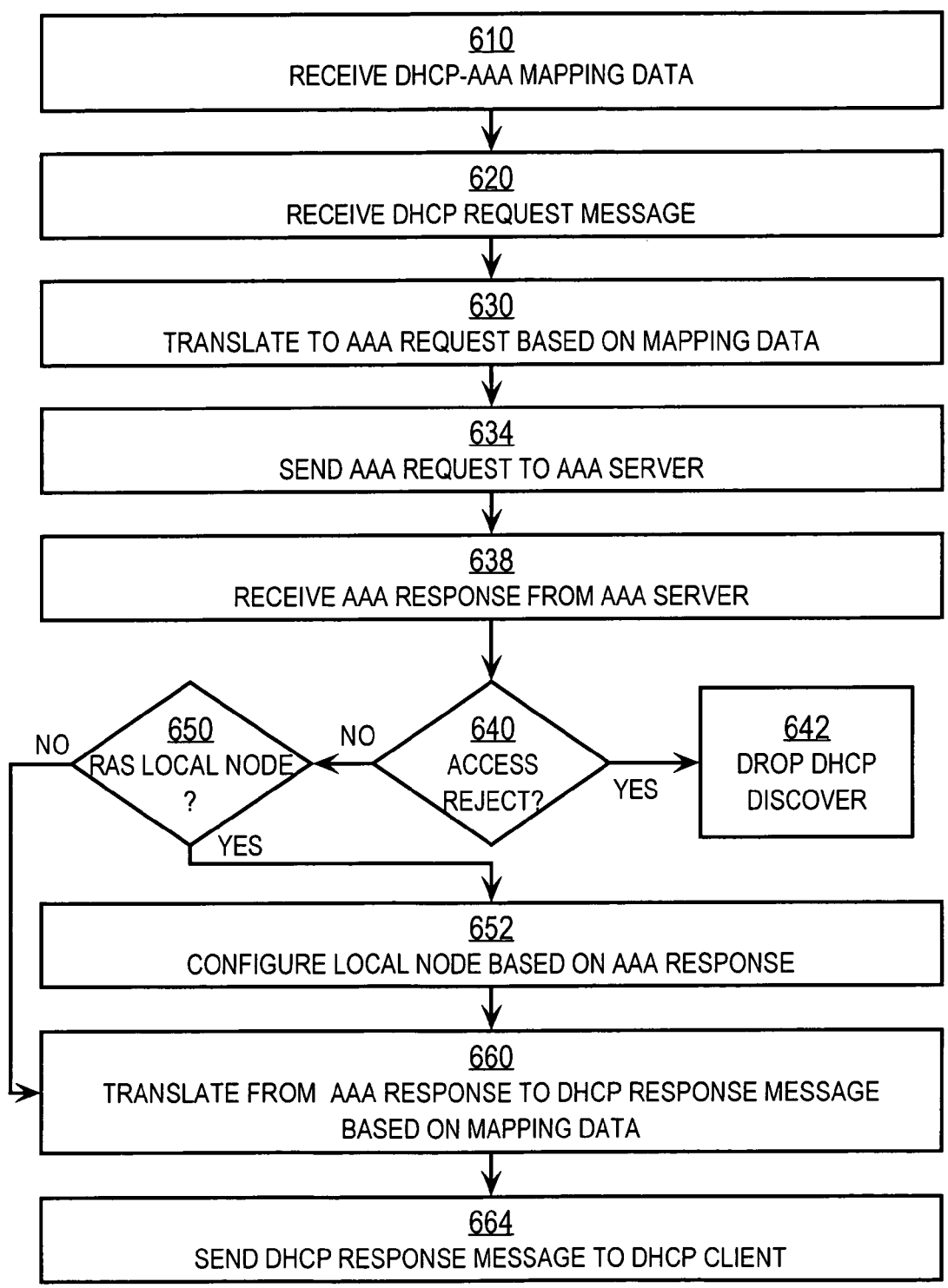
FIG. 6 is a flow diagram that illustrates a method at a modified DHCP server, according to an embodiment.

As described in more detail in the next section with reference to FIG. 6, the modified DHCP server 480 engages DHCP-AAA conversion process 464 to convert between data communicated with an AAA server as AAA attributes and data communicated with a DHCP client as DHCP options or option data fields.

Figure 5:
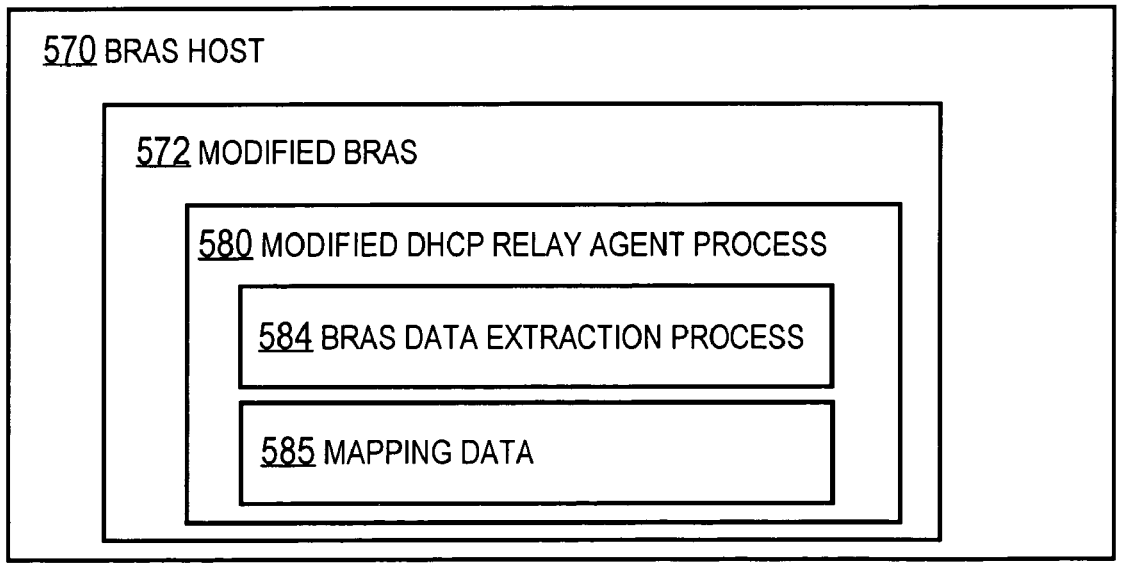
FIG. 5 is a block diagram that illustrates a BRAS host, according another embodiment.

FIG. 5 is a block diagram that illustrates a BRAS host 570, according to another embodiment. The BRAS host 570 includes a modified BRAS 572, a modified DHCP relay agent process 580 (such as modified DHCP process 147 on BRAS host 154), a BRAS data extraction process 584, and a mapping data structure 585. A DHCP relay agent process executes on an intermediate network node to transfer DHCP messages received on one link of the node to one or more different links on the node, so that a DHCP server need not be on the same network segment as a DHCP client. The modified DHCP relay agent process 580 is modified from a standard DHCP relay agent process in order to engage BRAS data extraction process 584. The BRAS data extraction process 584 uses the data in the mapping data structure 585. In some embodiments, the modified DHCP relay agent process also engages a DHCP-AAA conversion process. The modified relay agent process 580 communicates directly or indirectly with a modified DHCP server 480.

In other embodiments, DHCP relay agent 580 or BRAS data extraction process 584, or both, are external to modified BRAS 572 and interact with modified BRAS 572 through an API.

The mapping data structure 585 holds data that indicates an association between an AAA attribute used in BRAS interactions with an AAA server (for configuration data for remote access by a user through the BRAS) and a corresponding DHCP option. In an illustrated embodiment, mapping data structure 585 includes fewer associations than listed in Table 1. In one illustrated embodiment, only associations for data consumed at the BRAS are included in mapping data structure 585. In other embodiments, the DHCP server performs the function of the AAA server; and all BRAS communications formerly exchanged with an AAA server using AAA attributes are not exchanged with the DHCP server using DHCP attributes to which the AAA attributes map.

Figure 7:
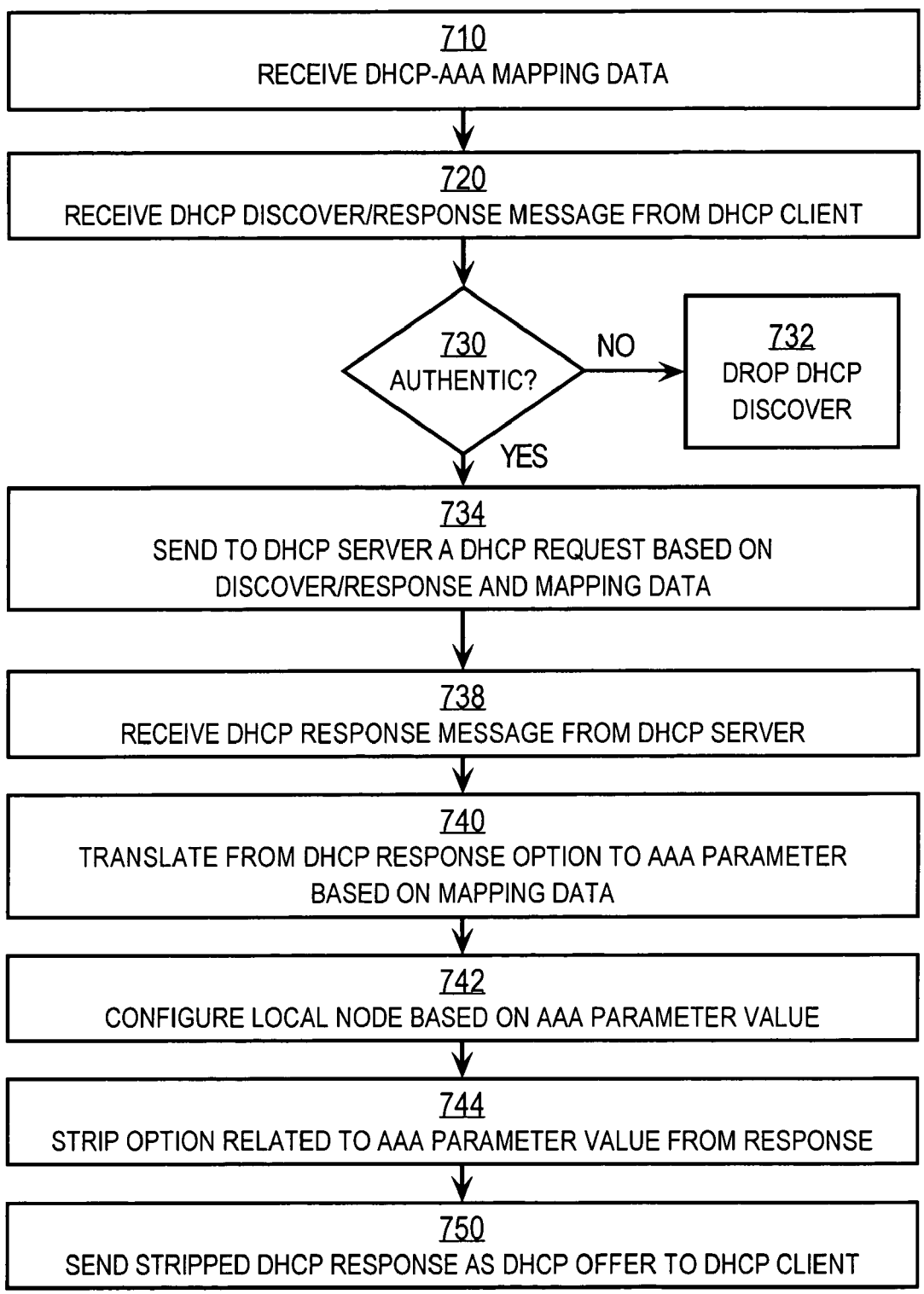
FIG. 7 is a flow diagram that illustrates a method at a modified DHCP relay agent, according to an embodiment.

As described in more detail in the next section with reference to FIG. 7, the modified DHCP relay agent 580 receives DHCP messages from a DHCP server and strips off DHCP options for data that is consumed at the BRAS and not forwarded to a DHCP client.

3.0 Methods for AAA Interactions Using DHCP

According to various embodiments of the invention, DHCP standards are adapted to allow DHCP messages to replace PPP based interactions between a BRAS, a customer node and an AAA server. In some embodiments an AAA server is eliminated and all configurations is done at a BRAS using DHCP messages exchanged with a DHCP server instead of an AAA server and with the customer node.

3.1 Methods for Modified DHCP Server

FIG. 6 is a flow diagram that illustrates a method 600 for a modified DHCP server 480, according to an embodiment. In some embodiments, the modified DHCP server 480 is included in or engaged by a modified BRAS 472 on a BRAS host, e.g., DHCP process 147 on BRAS host 154. In some embodiments, the modified DHCP server is on a separate host, e.g., DHCP process 148 on DHCP host 120f, or process 133 on AAA host 120e.

Although steps are shown in FIG. 6 and subsequent flow diagrams in a particular order for purposes of illustration, in other embodiments the steps may be performed in a different order or overlapping in time or one or more steps may be omitted or the steps may be changed in some combination of ways.

In step 610 mapping data is received that indicates an association between DHCP option types (or data fields 326 within an option field 322 for an option type 323) and AAA attributes, such as RADIUS attributes, used to configure a user end node and BRAS for access to a core network. Any method may be used to receive the mapping data, including, but not limited to predefined data stored within source code or in files stored with executable code ("default values") or in files or a database accessible to the process, manual input either in response to prompts from the process or independently of prompts, or from data included in a message sent to the server by another server or from a client process, such as a client process on an end node operated by an agent of the service provider. In an illustrated embodiment, at least some of the associations listed in Table 1 are received during step 610

In step 620, a DHCPDISCOVER message is received from a DHCP client attempting to gain access to the ISP provider network. In some embodiments, this DHCPDISCOVER message is received from a conventional DHCP client. In some embodiments, this DHCPDISCOVER message is received from a DHCP client as modified in the description of Townsley I for authentication or as modified in the description of Townsley II for session support, or both. In some embodiments, step 620 includes steps described in Townsley I to issue an authentication challenge and receive an authentication response. In some embodiments the DHCPDISCOVER message of the DHCP authentication response includes a DHCPALTTH—Protocol option that indicates a hash function used to verify the response. In some embodiments, step 620 includes steps described in Townsley II to issue an echo request and receive an echo response. For purposes of illustration it is assumed that, after step 620, the modified DHCP Server has the DHCP values listed in Table 2

TABLE 2

Example DHCP option type values after step 620.

| DHCP option type (data field) | Example value |
|---|---|
| yiaddr | 0.0.0.0 [?] |
| subnet mask | 255.255.255.255 [?] |
| giaddr | NAS-ID (such as BRAS IP address) |
| chaddr | MAC xxxxxxxxx |
| *DHCPAUTH-Response (CHAP Name) | Sue Q. Doe |
| *DHCPAUTH-Response | ffffffffffffffff |
| *DHCPAUTH-Protocol | 5 (=MD5 hash function) |

In step 630, values in one or more DHCP options types in the DHCPDISCOVER message are translated to corresponding values in associated AAA attributes for an AAA request based on the mapping data. For example, a RADIUS Access Request message is formed from the DHCPDISCOVER and Challenge messages. For example, after step 630, the AAA Request message has the RADIUS attribute values listed in Table 3.

TABLE 3

Example RADIUS attribute values after step 630.

| RADIUS attribute | Example value |
|---|---|
| Framed-IP-Address | 0.0.0.0 |
| Framed-IP-Netmask | 255.255.255.255 |
| NAS-Identifier | NAS-ID |
| Client-MAC-Address | MAC xxxxxxxxx |
| User-Name | Sue Q. Doe |
| CHAP-Response | ffffffffffffffff |
| CHAP-Hash-Algorithm | 5 (=MD5 hash function) |
| Service-Type | null |
| NAS-Port-Type | Ethernet |
| NAS-Port | 128 |
| NAS-Port-ID | 64 |

The first 6 RADIUS attributes are determined based on the DHCPDISCOVER and DHCPAUTH Response messages (with DHCP options listed in Table 2) and the mapping data. The last four RADIUS attributes are filled by the BRAS to indicate a request for service type information and to identify the NAS port. In this embodiment, the last four RADIUS attributes are not based on the DHCP option values and the mapping data.

In step 634 the AAA request is sent to an AAA server. In the illustrated embodiment, the RADIUS Access-Request message with contents listed in Table 3, is sent to the RADIUS server 133 on AAA host 120e.

In step 638 an AAA response is receive from the AAA server.

In the illustrated embodiment, control passes from step 638 to step 640 to determine whether the AAA response indicates that access is denied. If so, control passes to step 642 to drop the DHCPDISCOVER message and associated data. In some embodiments, step 642 includes sending a DHCP Failure message, as described in Townsley I, to the DHCP client. In some embodiments, step 640 and 642 are omitted; and control passes directly to step 650.

In step 650, it is determined whether the local node receiving the AAA response is the remote access server (e.g., a BRAS). If so, control passes to step 652. If not control skips step 652 and passes to step 660.

In the illustrated embodiment, it is assumed for purposes of illustration that the AAA response is a RADIUS Access- Accept message, with contents as listed in Table 4, and that the modified DHCP server is executing within a BRAS, so that step 650 is answered in the affirmative. Control then passes to step 652.

TABLE 4

Example RADIUS Access-Accept Message.

| RADIUS attribute | Example value |
| --- | --- |
| Framed-IP-Address | 255.255.255.254 |
| Framed-IP-Netmask | 255.255.255.0 |
| AV-Pair | ip:addr-pool=dhcp-pool1 |
| Client-Primary-DNS | root.name.server.a |
| Client-Secondary-DNS | root.name.server.b |
| MS-Primary-NBNS-Server | 30 |
| MS-Secondary-NBNS-Server | 31 |
| Access-Accept-Reply-Message | Welcome to Provider's IP Network |
| Client-Host-Name | HostessA |
| Client-Domain-Name | ProviderDomainX |
| DHCP-Lease-Time | 36000 seconds |
| Service-Type | bronze |
| Access-Control-List | ACLaddr1, ACLaddr1, ACLaddr3, . . . |

In step 652, the local node is configured as the NAS based on the AAA response. For example, the BRAS is configured based on the RADIUS response. In the illustrated embodiment, the BRAS is configured to filter out IP data packets for the DHCP client node (e.g., node 120*a*) that are not from the IP addresses listed in the Access-Control-List attribute. The BRAS also learns from the RADIUS response that the DHCP client host is being assigned the IP address 255.255.255.254. So it updates its routing table to show IP address 255.255.255.254 is reachable through the BRAS link with access network 110*c*. The BRAS is also configured to provide the client host with bronze service instead of the available silver.

In step 660, values for one or more AAA attributes in the AAA response message are translated to corresponding values in associated DHCP option types (or data fields within an option) for a DHCP message based on the mapping data. For example, a DHCPAUTH-Success message is formed from the RADIUS Access-Accept message and the mapping of Table 1. Thus a DHCPAUTH-Success message is formed with the message "Welcome to Provider's IP network." Similarly, a DHCP OFFER message is formed from the RADIUS Access-Accept message and the mapping of Table 1. For example, after step 660, a DHCP OFFER message has the DHCP option types and values listed in Table 5.

TABLE 5

Example DHCP OFFER based on RADIUS Access-Accept Message of Table 4.

| DHCP option type (data field) | Example value |
| --- | --- |
| yiaddr | 255.255.255.254 |
| subnet mask | 255.255.255.0 |
| DNS server | root.name.server.a |
| WINS/NBNS server | 30 |
| hostname | HostessA |
| domainname | ProviderDomainX |
| lease | 36000 seconds |

In step 664, the DHCP message is sent to the DHCP client. For example, the DHCPAUTH-Success message is sent to a DHCP client modified as described in Townsley I. In the illustrated embodiment, the DHCP OFFER with contents from Table 5 is sent to a conventional DHCP client or a modified DHCP client.

In embodiments in which the local node is not a remote access server (RAS) like the BRAS, a DHCP request message is received from a RAS and a DHCP response is returned to the RAS with data for the RAS and the client. For example, in some embodiments in which the modified DHCP server executes on a separate DHCP host 120*f*, the DHCP message sent from the BRAS to the DHCP server includes all the data for an AAA access request. A DHCP response from the DHCP server to the BRAS includes all the AAA information sent to the BRAS.

An example of such a DHCP request message formed at the BRAS and sent to the DHCP server is described below with reference to step 734 in FIG. 7 for a modified DHCP relay agent process at the BRAS. An example of such a DHCP response message formed in step 660 and sent in step 664 is shown in Table 6.

TABLE 6

Example DHCP Message sent to BRAS from separate DHCP server.

| DHCP option type (data field) | Example value |
| --- | --- |
| yiaddr | 255.255.255.254 |
| Subnet mask | 255.255.255.0 |
| *DHCPAAA-AVPair(ip:addr-pool) | dhcp-pool1 |
| DNS-Server | root.name.server.a |
| DNS-Server | root.name.server.b |
| WINS/NBNS Server | 30 |
| WINS/NBNS Server | 31 |
| *DHCPAUTH-Success(Message) | Welcome to Provider's IP Network |
| hostname | HostessA |
| domainname | ProviderDomainX |
| lease | 36000 seconds |
| *DHCPAAA-Service | bronze |
| *DHCPAAA-ACL | ACLaddr1, ACLaddr1, ACLaddr3, . . . |

In such embodiments, an AAA server may be omitted and a BRAS or other NAS responds to requests for access using DHCP messages exchanged with the DHCP client and the separate DHCP server.

3.2 Methods for Modified DHCP Relay Agent

FIG. 7 is a flow diagram that illustrates a method 700 for a modified DHCP relay agent process 580, according to an embodiment in which the modified DHCP relay agent process is included in or engaged by a modified BRAS 572 on a BRAS host 570, e.g., DHCP process 147 on BRAS host 154.

In step 710 mapping data is received that indicates an association between DHCP option types (or data fields 326 within an option field 322 for an option type 323) and AAA attributes, such as RADIUS attributes, used to configure a user end node and BRAS for access to a core network. Any method may be used to receive the mapping data, including methods described above for step 610.

In step 720, a DHCPDISCOVER message is received from a DHCP client attempting to gain access to the ISP provider network, as described above for step 620. In some embodiments other DHCP messages are received from the client, such as a DHCPAUTH Response message.

In step 730, it is determined whether the DHCPDISCOVER or DHCPAUTH-Response is from an authentic user. Any method may be used to determine whether the user requesting configuration data is authentic, including using the Challenge Handshake Authentication Protocol (CHAP) over PPP or CHAP over DHCP as described in Townsley I. If the DHCP DISCOVER message is not from an authenticated user, control passes to step 732. In step 732 the DHCPDISCOVER message and associated data is dropped and not processed further. In some embodiments, step 732 includes sending a DHCPAUTH-Failure message. If the DHCPDISCOVER message is determined to be from an authenticated user, control passes to step 734. In some embodiments, in which authentication is not performed, or in which a DHCP server performs authentication, steps 730 and 732 are omitted, and control passes directly to step 734.

In step 734, A DHCP request is formed based on the DHCPDISCOVER message and the mapping data. For example, if the BRAS is acting as a relay agent, it forwards the DHCPDISCOVER message from the client; if it is acting as a "proxy", it may form an independent DHCPDISCOVER message. In some cases the request is a DHCP renewal request. As used herein a "DHCP request" covers all such initiatives from a client. The DHCP request is sent to the DHCP server. An unmodified DHCP relay agent process forwards the DHCP request unchanged onto one or more links that reach one or more DHCP servers. According to some embodiments, the DHCP request formed by the modified DHCP relay agent process adds DHCP options related to obtaining configuration information for the BRAS as well and guiding the DHCP server in forming its response. In the illustrated embodiment, the DHCP request message formed in step 734 includes data formerly sent to an AAA server, such as in a RADIUS Access-Request message with contents listed in Table 3. This information is placed in a DHCP Request using the mapping data to produce a DHCP Request with contents given by Table 7.

TABLE 7

Example DHCP request message after step 734.

| DHCP option type (data fields) | Example value |
|---|---|
| yiaddr | 0.0.0.0 |
| Subnet mask | 255.255.255.255 |
| giaddr | NAS-ID |
| chaddr | MAC xxxxxxxxx |
| *DHCPAUTH-Challenge (CHAP Name) | Sue Q. Doe |
| *DHCPAUTH-Response | ffffffffffffffff |
| *DHCPAUTH-Protocol | 5 (=MD5 hash function) |
| *DHCPAAA-Service | silver |
| *DHCPAAA-Port (Type) | [Mark, Vince what value here?] |
| *DHCPAAA-Port (Number) | [Mark, Vince what value here?] |
| *DHCPAAA-Port (ID) | [Mark, Vince what value here?] |

In some embodiments that defer the CHAP to the DHCP server, the DHCPAUTH options are absent in the first DHCP Request, but appear in a separate DHCPAUTH Response message that follows in response to a DHCP challenge from the DHCP server.

In step 738, a DHCP response is received from the DHCP server. In some embodiments the first response is a DHCP-AUTH-Challenge, which is simply passed back to the DHCP client as in a relay agent described in Townsley I. After a DHCPAUTH-Response response is received from the DHCP client, passed to the DHCP server, and found successful, then the DHCP response is received in step 738. In an illustrated embodiment, the DHCP response includes configuration data for both the RAS and the DHCP client host. For example, a DHCP response is received with contents as listed in Table 6, described above.

In step 740, DHCP options associated with AAA attributes that configure the RAS are translated based on the mapping data. For example, BRAS configuration data from a RADIUS server is recognized in the DHCP response message by translating the DHCP options or options values (DHCPAAA-AV-Pair (ip:addr-pool), the second DNS server, the second WINS/NBNS server, DHCPAAA-Service, and DHCPAAA-ACL) to the associated RADIUS attributes or values (ip:addr-pool, Client-Secondary-DNS, MS-Secondary-NBNS-Server, Service-Type and Access-Control-List). In some embodiments, step 740 is omitted and the RAS simply recognizes the DHCP options that relate to configuration on the RAS.

In step 742, the local node is configured based on the values for these attributes/options. For example, the BRAS is configured based on ip:addr-pool=dhcp-pool1, Client-Secondary-DNS=root.name.server.b, MS-Secondary-NBNS-Server=31, Service-Type=bronz and Access-Control-List=ACLaddr1, ACLaddr2, ACLaddr3, . . . .

In step 744, the DHCP options related to configuring the RAS are stripped from the response. In the illustrated embodiment, the DHCP options stripped from the DHCP response for Table 6 leaves the DHCP options listed in Table 8.

TABLE 8

Example stripped DHCP Response Message.

| DHCP option type (data field) | Example value |
|---|---|
| yiaddr | 255.255.255.254 |
| Subnet mask | 255.255.255.0 |
| DNS-Server | root.name.server.a |
| WINS/NBNS Server | 30 |
| *DHCPAUTH-Success(Message) | Welcome to Provider's IP Network |
| hostname | HostessA |
| domainname | ProviderDomainX |
| lease | 36000 seconds |

In step 750, the stripped DHCP response is sent to the DHCP client as a DHCP OFFER message. For example, the contents of Table 8 are sent to the DHCP client as the DHCP OFFER. These contents are similar to the DHCP OFFER message contents listed in Table 5, and thus appear the same to the DHCP client on the customer end node.

4.0 Configuring Network Access Without PPP

In some embodiments, all functions for remote access performed using PPP are replaced, using DHCP formatted messages including one or more DHCP options that are not part of the DHCP standard at the time of this writing. In various embodiments, different combinations of PPP functions are performed at different nodes of the remote access network. Communications among participating nodes are performed using DHCP-formatted messages. Two embodiments are described in more detail in this section. In other embodiments, other combinations are employed. For example, a modified DHCP relay agent at the BRAS interacts with a legacy AAA server using legacy AAA messages, as in the first example, executes a challenging process as part of authenticating the DHCP client, and interacts with a legacy DHCP server using legacy DHCP messages to obtain client configuration data

4.1 Modified DHCP Server at BRAS

In a first embodiment for replacing PPP functionality with DHCP messages and modified DHCP processes, a modified BRAS engages a modified DHCP server to communicate with a legacy AAA server and a modified DHCP client on a customer premises end node. The modified DHCP server performs an embodiment of method 600 described herein and of methods described in Townsley I and Townsley II. The modified DHCP client performs an embodiment of methods described in Townsley I and Townsley II. The legacy AAA server is a RADIUS server that performs according to RADIUS standards in force at the time of this writing.

Figure 8:
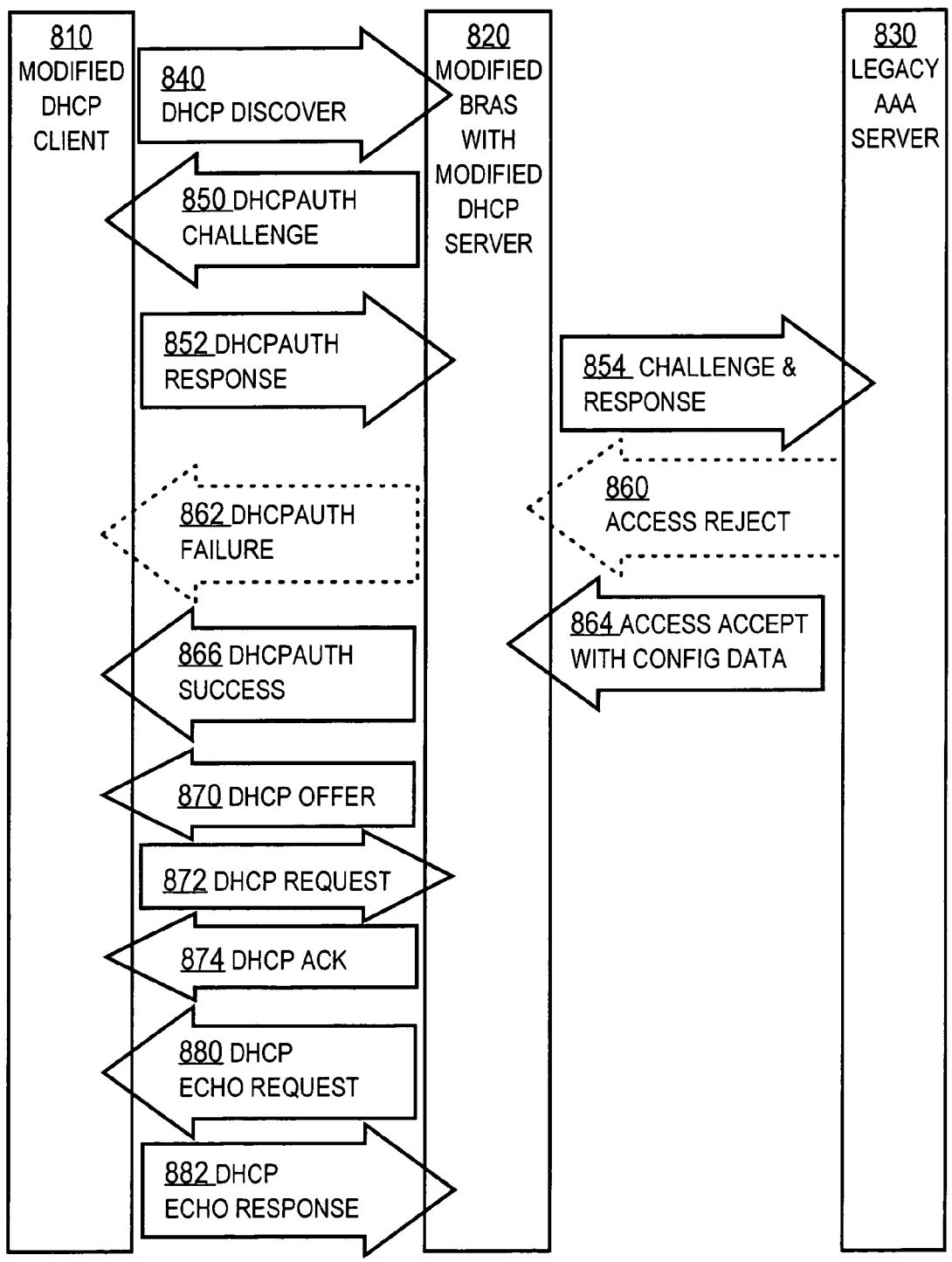
FIG. 8 is a time line diagram that illustrates a sequence of DHCP messages to replace PPP messages, according to an embodiment.

FIG. 8 is a time line diagram that illustrates a sequence of DHCP messages to replace PPP messages for providing access to a core IP network disposed behind a BRAS, according to an embodiment. Time increases downward. Three processes on different network nodes in different sub-networks are illustrated exchanging data packets: a modified DHCP client 810, a modified BRAS 820 with a modified DHCP server, and a legacy AAA server 830. Messages are indicated by arrows and a message direction is indicated by a direction of an arrow. An intervening intermediate network node, if any, such as an access module 152, is not shown. It is assumed that conventional DHCP relay agent processes execute on any intervening intermediate network node. For purposes of illustration it is assumed that the modified DHCP client 810 DHCP is process 131 on end node 120a; the modified BRAS 820 includes modified DHCP server that is process 147 on BRAS host 154; and the legacy AAA server 830, a RADIUS server, is process 133 on host 120e.

In the illustrated embodiment, the sequence begins with a conventional DHCPDISCOVER message 840 sent from client 810 to BRAS 820. In other embodiments, the DHCPDISCOVER message is modified to include a DHCPAUTH-Protocol option.

In response to receiving the DHCPDISCOVER message, BRAS 820 sends a DHCPAUTH-Challenge message 850 to client 810 to begin an authentication phase before producing a DHCPOFFER, as described in Townsley I. In response, client 810 sends a DHCPAUTH-Response message 852 to BRAS 820. The BRAS 820 forms and sends a RADIUS CHAP message 854 that includes the challenge value sent in DHCPAUTH-Challenge message 850 and the response value received in DHCPAUTH-Response message 852. For example, modified DHCP server on BRAS 820 performs steps 630 of method 600 based on the mapping data to generate message 854 from the DHCPDISCOVER message 840 and DHCPAUTH-Response message 852. In an example embodiment, message 854 holds the RADIUS attributes and values listed in Table 3, above.

The legacy AAA server 830 verifies the response using the challenge value and secret password shared with a user of the client 810 to determine whether the response is correct. If not, the AAA server sends an AAA access denied message, such as a RADIUS Access-Reject message 860. It is assumed for purposes of illustration that the response is verified correct in AAA server 830. Therefore the Access Reject message 860 is not sent. An Access Reject message 860 that would have been sent if the response were not verified is indicated by the arrow outlined by a dashed line. This would be translated to a DHCPAUTH-Failure message 862 in step 642 of method 600 based on the mapping data. DHCPAUTH-Failure message 862 is also an arrow outlined by a dashed line to indicate that this message would have been sent only if the response value is not verified correct at the AAA server 830.

If the response value is verified correct at the AAA server, then the AAA server sends an AAA access granted message, such as RADIUS Access-Accept message 864, with user profile data and other data used to configure the BRAS and customer premises end node. In an example embodiment, message 864 holds the RADIUS attributes and values listed in Table 4, above In response to receiving the RADIUS Access-Accept message 864, the modified DHCP server on BRAS 820 forms and sends a DHCPAUTH-Success message 866 that includes the message value sent in RADIUS Access-Accept message 864 based on the mapping data. In some embodiments, DHCP-AUTH-Success message 866 is not sent.

The BRAS also configures itself with the BRAS configuration information found in the RADIUS Access-Accept message 864. For example, BRAS 820 performs steps 650 and 652 of method 600 based on the mapping data to configure itself for IP communications with the customer end node using dhcp-pool1, secondary DNS server root.name.server.b, secondary-NBNS server 31, service type bronze, and ACL that includes ACLaddr1, ACLaddr2, ACLaddr3 . . . .

The modified DHCP server on BRAS 820 also forms and sends a DHCP OFFER message 870 that includes customer end node configuration data, including an IP address for unicast communications, based on RADIUS attributes in the Access-Accept message 864 and the mapping data. For example, modified DHCP server on BRAS 820 performs steps 660 and 664 of method 600 based on the mapping data to generate message 870 from message 864. In an example embodiment, DHCP OFFER message 870 holds the DHCP options and values listed in Table 5, above.

The DHCP client on customer end node then accepts the offered configuration by exchanging DHCP Request message 872 and DHCP Acknowledgement (ACK) message 874 with the DHCP server on BRAS 820, as is conventional in the prior art.

Occasionally or periodically, the BRAS 820 determines whether the customer end node is still communicating with the core IP network by sending a DHCP ECHOREQUEST message 880 to the DHCP client, as described in Townsley II. If the customer end node is still connected, the modified DHCP client responds with a DHCP ECHOREPLY message 882, as described in Townsley II. If a valid DHCP ECHOREPLY message 882 is not received within a designed reply time, then the BRAS responds to a lost connection, as described in Townsley II.

Thus, following the sequence of messages depicted in FIG. 8, a BRAS can replace all PPP functions with DHCP messages and modified DHCP processes, using a legacy AAA server.

4.2 Modified DHCP Relay Agent at BRAS

In a second embodiment for replacing PPP functionality with DHCP messages and modified DHCP processes, a modified BRAS engages a modified DHCP relay agent to communicate with a modified DHCP server on a provider end node and communicate with a modified DHCP client on a customer premises end node. The modified DHCP relay agent process performs an embodiment of method 700 described herein. The modified DHCP server performs embodiments of method 600 described herein and in Townsley I and Townsley II. The modified DHCP client performs an embodiment of methods described in Townsley I and Townsley II. In a third embodiment, mentioned in passing, the legacy AAA server is replaced by the modified DHCP server and a database of configuration data for both a BRAS and customer premises end node.

Figure 9:
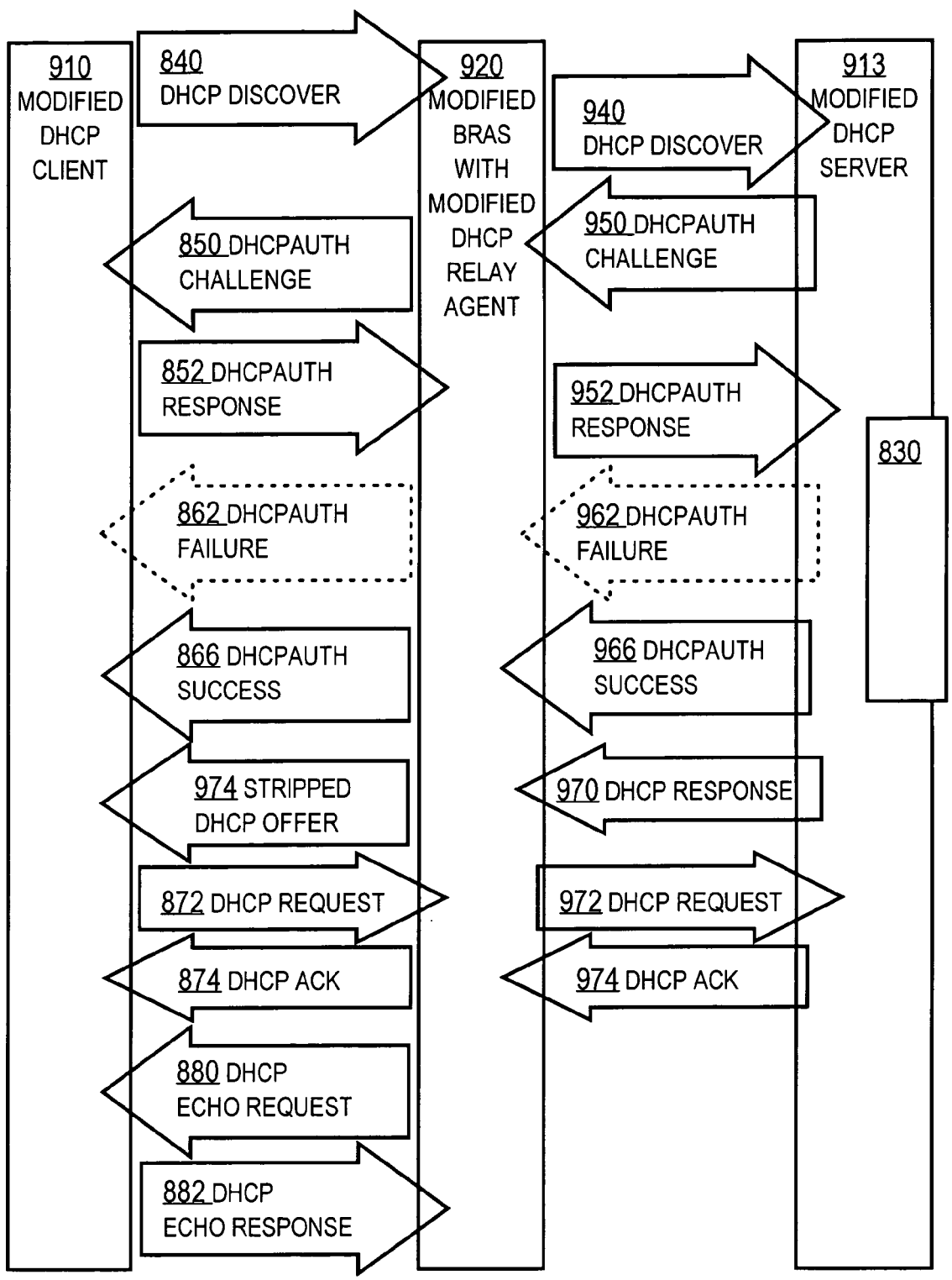
FIG. 9 is a time line diagram that illustrates a sequence of DHCP messages to replace PPP messages, according to another embodiment.

FIG. 9 is a time line diagram that illustrates a sequence of DHCP messages to replace PPP messages, according to another embodiment. Time increases downward. Three processes on different network nodes in different sub-networks are illustrated exchanging data packets: a modified DHCP client 810, a modified BRAS 920 with a modified DHCP relay agent process, and a modified DHCP server 913 on a separate node in place of a legacy AAA server 830. Messages are indicated by arrows and a message direction is indicated by a direction of an arrow. An intervening intermediate network node, if any, such as an access module 152, is not shown. It is assumed that a conventional DHCP relay agent processes execute on any intervening intermediate network node. For purposes of illustration it is assumed that the modified DHCP client 810 DHCP is process 131 on end node 120a; the modified BRAS 920 includes modified DHCP relay agent process 147 on BRAS host 154; and modified DHCP server is process 148 on host 120f.

In the illustrated embodiment, the sequence begins with a conventional DHCPDISCOVER message 840 sent from client 810 to BRAS 920. In other embodiments, the DHCPDISCOVER message is modified to include a DHCPAUTH-Protocol option.

In response to receiving the DHCPDISCOVER message, the DHCP relay agent process in BRAS 920 forwards the DHCPDISCOVER message, unchanged, as DHCPDISCOVER message 940 to DHCP server 913.

To begin an authentication phase before producing a DHCPOFFER, as described in Townsley I, modified DHCP server 913 sends a DHCPAUTH-Challenge message 950 to the DHCP relay agent in BRAS 920, which forwards the message unchanged as DHCPAUTH-Challenge message 850 to client 810. In response, as in FIG. 8, modified DHCP client 810 sends a DHCPAUTH-Response message 852 to BRAS 820, as described in Townsley I. The DHCP relay agent in BRAS 920 forwards the response message unchanged as DHCPAUTH-Response message 952.

Modified DHCP server 913 verifies the response based on a secret password shared with a user of the customer end node with client 810. In some embodiments, the secret is stored in a backend database for the DHCP server 913. In some embodiments, the secret is stored at an AAA server; and the DHCP server forms an AAA request message with the challenge and response values, like message 854 in FIG. 8, and sends it to a legacy AAA server 830. In such embodiments, the modified DHCP server 913 performs steps 630, 634 and 638 of method 600 using the mapping data. In such embodiments the AAA server verifies the response and sends back an AAA access granted or denied message to the modified DHCP server.

Whether using the legacy AAA server or its own backend database, the modified DHCP server determines whether the response is correct, thus performing step 640 of method 600. If the response is not correct, the modified DHCP server sends a DHCPAUTH-Failure message 962 in step 642 of method 600. It is assumed for purposes of illustration that the response is verified correct. Therefore the DHCPAUTH-Failure message 962 is not sent. A DHCPAUTH-Failure message 962 that would have been sent if the response were not verified is indicated by the arrow outlined by a dashed line. This would be forwarded as DHCPAUTH-Failure message 862 by the DHCP relay agent in BRAS 920. DHCPAUTH-Failure message 862 is also an arrow outlined by a dashed line to indicate that this message would have been sent only if the response value is not verified correct at modified DHCP server 913.

If the response value is verified correct at modified DHCP server 913, then the modified DHCP server retrieves user profile data and other data used to configure the BRAS and customer premises end node from a backend database. In some embodiments, the data comes to modified DHCP server in an AAA access granted message like message 864 in FIG. 8. In some embodiments a DHCPAUTH-Success message 966 is sent to the BRAS 920 and forwarded unchanged by DHCP relay agent process as DHCPAUTH-Success message 866 to DHCP client 810.

The user profile and configuration information is placed in a DHCP response message 970 in DHCP options defined for such configuration using the mapping data. In an example embodiment, message 970 holds the DHCP options and values listed in Table 6, above. In some such embodiments, the separate DHCPAUTH-Success messages 966, 866 are not sent, but any relevant data is included in message 970. For example a success message is included in DHCPAUTH-Success(Message) in message 970, as shown in Table 6.

The BRAS 920 configures itself with the BRAS configuration information found in the DHCP response message 970. For example, BRAS 920 performs step 738, step 740 and step 742 of method 700 based on the mapping data to configure itself for IP communications with the customer end node using dhcp-pool1, secondary DNS server root.name.server.b, secondary-NBNS server 31, service type bronze, and ACL that includes ACLaddr1, ACLaddr2, ACLaddr3 . . . .

The modified DHCP relay agent process on BRAS 920 also forms and sends a DHCP OFFER message 970 that includes customer end node configuration data but strips off the BRAS configuration data. For example, during step 744 and step 750, the modified DHCP relay agent process strips off the BRAS configuration data and forms a DHCP OFFER that includes an IP address for unicast communications, from the remaining DHCP options. For example, modified DHCP relay agent process on BRAS 920 generates message 974 from message 970. In an example embodiment, DHCP OFFER message 974 holds the DHCP options and values listed in Table 5, above. Thus message 974 looks like message 870 described above The DHCP client 810 on the customer end node then accepts the offered configuration by exchanging DHCP Request message 872 and DHCP Acknowledgement (ACK) message 874 with the DHCP server 913 through a DHCP relay agent on BRAS 920, as is conventional in the prior art. The DHCP relay agent on BRAS 920 forwards DHCP Request message 872 from client 810 unchanged to DHCP server 913 as DHCP Request message 972. Similarly, the DHCP relay agent on BRAS 920 forwards DHCP ACK message 974 from DHCP server 913 unchanged to DHCP client 810 as DHCP ACK message 874.

Occasionally or periodically, the BRAS 920 determines whether the customer end node is still communicating with the core IP network by sending to the DHCP client 810 a DHCP ECHOREQUEST message 880, as described in Townsley II. If the customer end node is still connected, the modified DHCP client responds with a DHCP ECHOREPLY message 882, as described in Townsley II. If a valid DHCP ECHOREPLY message 882 is not received within a designed reply time, the BRAS responds to a lost connection, as described in Townsley II.

Thus, following the sequence of messages depicted in FIG. 9, a BRAS can replace all PPP functions with DHCP messages and modified DHC processes, using a modified DHCP server 913 in place of or in front of a legacy AAA server.

5.0 Implementation Mechanisms—Hardware Overview

Figure 10:
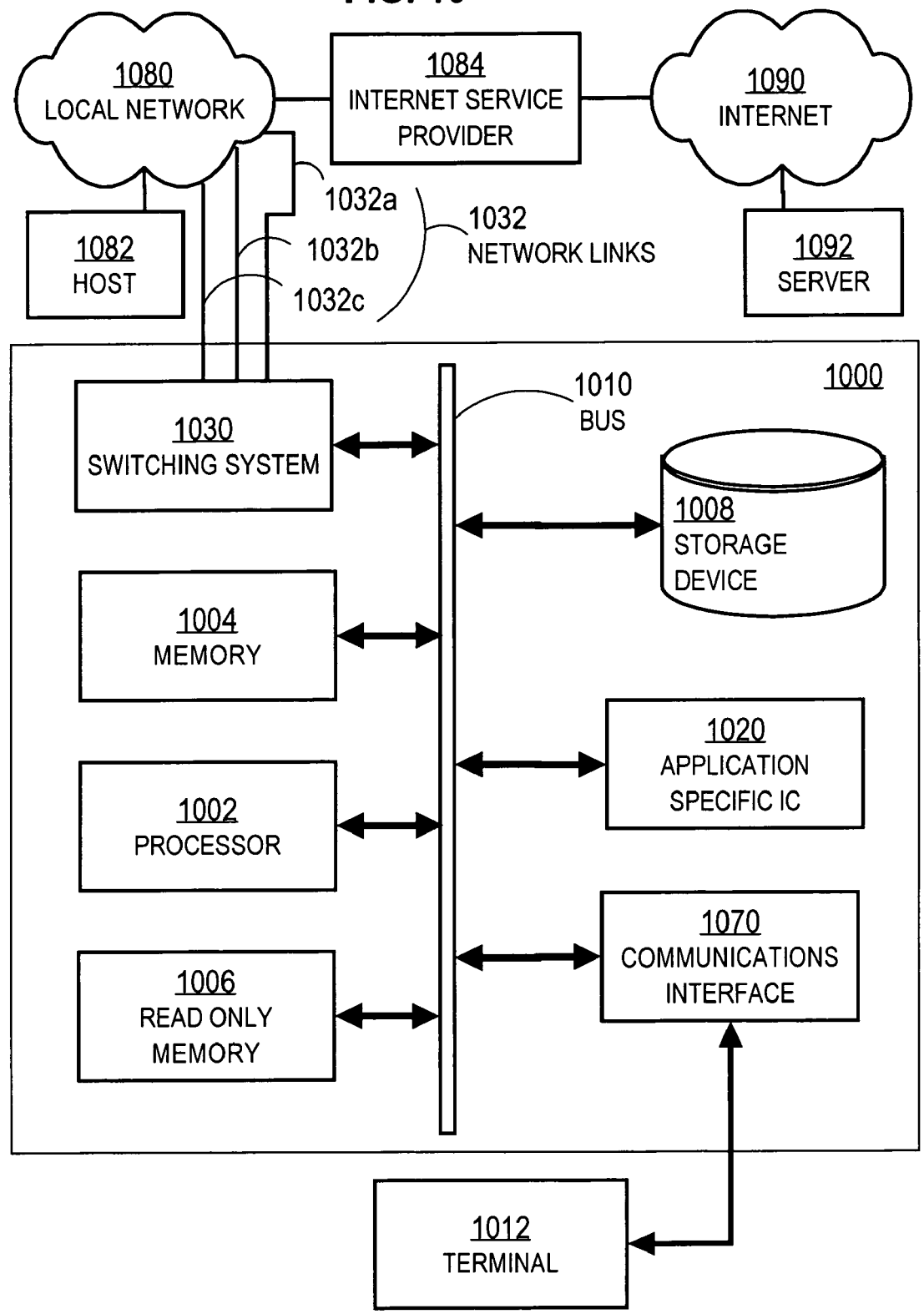
FIG. 10 is a block diagram that illustrates a computer system configured as an intermediate network node upon which an embodiment of the invention may be implemented.

FIG. 10 is a block diagram that illustrates a computer system 1000 upon which an embodiment of the invention may be implemented. The preferred embodiment is implemented using one or more computer programs running on a network node such as a router device. Thus, in this embodiment, the computer system 1000 is a network node.

Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitute computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 1010 for use by the processor from an external terminal 1012, such as a terminal with a keyboard containing alphanumeric keys operated by a human user, or a sensor. A sensor detects conditions in its vicinity and transforms those detections into signals compatible with the signals used to represent information in computer system 1000. Other external components of terminal 1012 coupled to bus 1010, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 1012. In some embodiments, terminal 1012 is omitted.

Computer system 1000 also includes one or more instances of a communications interface 1070 coupled to bus 1010. Communication interface 1070 provides a two-way communication coupling to a variety of external devices that operate with their own processors, such as printers, scanners, external disks, and terminal 1012. Firmware or software running in the computer system 1000 provides a terminal interface or character-based command interface so that external commands can be given to the computer system. For example, communication interface 1070 may be a parallel port or a serial port such as an RS-232 or RS-422 interface, or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 1000 includes switching system 1030 as special purpose hardware for switching information for flow over a network. Switching system 1030 typically includes multiple communications interfaces, such as communications interface 1070, for coupling to multiple other devices. In general, each coupling is with a network link 1032 that is connected to another device in or attached to a network, such as local network 1080 in the illustrated embodiment, to which a variety of external devices with their own processors are connected. In some embodiments an input interface or an output interface or both are linked to each of one or more external network elements. Although three network links 1032a, 1032b, 1032c are included in network links 1032 in the illustrated embodiment, in other embodiments, more or fewer links are connected to switching system 1030. Network links 1032 typically provides information communication through one or more networks to other devices that use or process the information. For example, network link 1032b may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides routing information for use with switching system 1030.

The switching system 1030 includes logic and circuitry configured to perform switching functions associated with passing information among elements of network 1080, including passing information received along one network link, e.g. 1032a, as output on the same or different network link, e.g., 1032c. The switching system 1030 switches information traffic arriving on an input interface to an output interface according to pre-determined protocols and conventions that are well known. In some embodiments, switching system 1030 includes its own processor and memory to perform some of the switching functions in software. In some embodiments, switching system 1030 relies on processor 1002, memory 1004, ROM 1006, storage 1008, or some combination, to perform one or more switching functions in software. For example, switching system 1030, in cooperation with processor 1004 implementing a particular protocol, can determine a destination of a packet of data arriving on input interface on link 1032a and send it to the correct destination using output interface on link 1032c. The destinations may include host 1082, server 1092, other terminal devices connected to local network 1080 or Internet 1090, or other routing and switching devices in local network 1080 or Internet 1090.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020 and circuits in switching system 1030, may be used in place of or in combination with software to implement the invention. Thus, embodiments of the invention are not limited to any specific combination of hardware and software.

The signals transmitted over network link 1032 and other networks through communications interfaces such as interface 1070, which carry information to and from computer system 1000, are exemplary forms of carrier waves. Computer system 1000 can send and receive information, including program code, through the networks 1080, 1090 among others, through network links 1032 and communications interfaces such as interface 1070. In an example using the Internet 1090, a server 1092 transmits program code for a particular application, requested by a message sent from computer 1000, through Internet 1090, ISP equipment 1084, local network 1080 and network link 1032b through communications interface in switching system 1030. The received code may be executed by processor 1002 or switching system 1030 as it is received, or may be stored in storage device 1008 or other non-volatile storage for later execution, or both. In this manner, computer system 1000 may obtain application program code in the form of a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to an infra-red signal, a carrier wave serving as the network link 1032b. An infrared detector serving as communications interface in switching system 1030 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002 or switching system 1030.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing remote access to a service provider network comprising:
   receiving a request for access to the service provider network;
   exchanging a plurality of Dynamic Host Configuration Protocol (DHCP) formatted messages for accessing the service provider network by a customer node;
   mapping DHCP options to AAA attributes, wherein at least one of the DHCP options relating to quality of service is not mapped to corresponding AAA attributes, and wherein the mapping includes a translating function configured to translate values in the DHCP options to corresponding values in the AAA attributes and to translate in an opposite direction; and
   generating an AAA request message based on the mapping between the DHCP options and the AAA attributes, wherein the mapping includes port data, access control list data, and an attribute-value (A-V) pair data.

2. A method as recited in claim 1, said step of exchanging DHCP formatted messages further comprising the steps of:
   receiving a DHCP request message from a customer node;
   authenticating a user of the customer node including the steps of
      sending a challenge value in a DHCP formatted challenge message, receiving a response value in a DHCP formatted response message,
determining whether the response is correct, and
if it is determined that the response is correct, then determining that the user is authentic.

3. A method as recited in claim 2, said step of exchanging DHCP formatted messages further comprising the steps of:
if it is determined that the user is authentic, then sending configuration data to the customer node in a DHCPOFFER message, including causing the DHCPOFFER message to be formed based at least in part on the mapping data.

4. A method as recited in claim 2, said step of exchanging DHCP formatted messages further comprising the step of, if it is determined that the user is authentic, then performing the steps of:
determining whether the customer node is connected, including
sending a DHCP formatted echo request message,
determining whether a corresponding DHCP formatted echo reply message is received within a particular reply time, and
if it is determined that a corresponding DHCP formatted echo reply message is not received within the particular reply time, then determining that the customer node is not connected; and
if it is determined that the customer node is not connected, then responding to an end of session state with the user of the customer node.

5. A method as recited in claim 1, further comprising the steps of:
in response to sending the AAA request message, receiving an AAA response message that holds data that indicates values for configuration attributes;
forming a DHCPOFFER message based on the AAA response message and the mapping data; and
sending the DHCPOFFER message to the customer node.

6. A method as recited in claim 5, further comprising:
determining a value for a particular configuration attribute for a remote access server based on the AAA response; and
excluding the particular configuration attribute from the DHCPOFFER message.

7. A method as recited in claim 5, wherein the plurality of option types for DHCP includes a new option type specifically included in a DHCP standard to be associated with an AAA configuration attribute for communications between a customer node on customer premises and the provider network on premises different from the customer premises.

8. A method as recited in claim 7, wherein the new option is a DHCPAUTH-Success option associated with a Remote Authentication Dial-In User Service (RADIUS) successful authentication reply message.

9. A method as recited in claim 1, wherein the plurality of option types for DHCP includes a plurality of new option types specifically included in a DHCP standard so that every AAA configuration attribute for communications between a customer node on customer premises and the provider network on premises different from the customer premises is associated with at least one DHCP option type.

10. A method for communicating configuration data for user access to a service provider network, comprising:
receiving mapping data that indicates an association between a plurality of configuration attributes available from an Authentication, Authorization and Accounting (AAA) server for communicating with the service provider network and a different plurality of option types for a Dynamic Host Configuration Protocol (DHCP);
receiving from a customer node a first DHCP request message for configuration data for communications between the customer node and the service provider network;
sending a second DHCP request message based on the first DHCP request message to a DHCP server to obtain values for DHCP option types;
in response to sending the second DHCP request message, receiving a DHCP response message that holds data that indicates values for a plurality of option types;
determining a value for a particular configuration attribute for a remote access server based on the DHCP response message and the mapping data; and
configuring the remote access server to communicate with the customer node based on the value for the particular configuration attribute, wherein the mapping data includes port data, access control list data, and an attribute-value (A-V) pair data.

11. A method as recited in claim 10, further comprising:
forming a DHCP OFFER message by stripping from the DHCP response message a DHCP option associated with the particular configuration attribute in the mapping data; and
sending the DHCP OFFER message to the customer node.

12. A method as recited in claim 11, wherein the DHCP option associated with the particular configuration attribute is a new option type specifically included in a DHCP standard to be associated with an AAA configuration attribute for a remote access server on a boundary between the provider network on provider premises and an access network, wherein the access network is between the remote access server and a customer node on customer premises different from the provider premises.

13. A method as recited in claim 12, wherein the DHCP option associated with the particular configuration attribute is the DHCP option associated with an attribute that depends on a user of the customer node.

14. A method as recited in claim 12, wherein the DHCP option associated with the particular configuration attribute is the DHCP option associated with a Remote Authentication Dial-In User Radius (RADIUS) attribute that indicates at least one of a quality of service level and an access control list.

15. A method as recited in claim 10, wherein the plurality of option types for DHCP includes a new option type specifically included in a DHCP standard to be associated with an AAA configuration attribute for communications between a customer node on customer premises and the provider network on premises different from the customer premises.

16. A method as recited in claim 15, wherein the new option is associated with a Remote Authentication Dial-In User Service (RADIUS) attribute associated with a user profile.

17. An apparatus for communicating configuration data for user access to a service provider network, comprising:
means for receiving mapping data that indicates an association between a plurality of configuration attributes available from an Authentication, Authorization and Accounting (AAA) server for communicating with the service provider network and a different plurality of option types for a Dynamic Host Configuration Protocol (DHCP);
means for receiving from a customer node a DHCP request message for configuration data for communications between the customer node and the service provider network;

means for forming an AAA request message based on the DHCP request message and the mapping data;

means for sending the AAA request message to the AAA server to obtain values for configuration attributes; and means for translating values in the DHCP options to corresponding values in the AAA attributes and vice versa in an opposite direction, wherein the mapping data includes port data, access control list data, and an attribute-value (A-V) pair data.

18. An apparatus for communicating configuration data for user access to a service provider network, comprising:

means for receiving mapping data that indicates an association between a plurality of configuration attributes available from an Authentication, Authorization and Accounting (AAA) server for communicating with the service provider network and a different plurality of option types for a Dynamic Host Configuration Protocol (DHCP);

means for receiving from a customer node a DHCP request message for configuration data for communications between the customer node and the service provider network;

means for sending a second DHCP request message based on the first DHCP request message to a DHCP server to obtain values for DHCP option types;

means for receiving a DHCP response message that holds data that indicates values for a plurality of option types in response to sending the second DHCP request message;

means for determining a value for a particular configuration attribute for a remote access server based on the DHCP response message and the mapping data; and means for configuring the remote access server to communicate with the customer node based on the value for the particular configuration attribute, wherein the mapping data includes port data, access control list data, and an attribute-value (A-V) pair data.

19. An apparatus for providing remote access to a service provider network, comprising:

a network interface that is coupled to a network for communicating one or more packet flows therewith;

one or more processors;

a computer readable medium; and one or more sequences of instructions stored on the computer readable medium, which, when executed by the one or more processors, causes the one or more processors to carry out the steps of:

receiving a request for access to the service provider network;

exchanging a plurality of Dynamic Host Configuration Protocol (DHCP) formatted messages for accessing the service provider network from a customer node;

mapping DHCP options to AAA attributes, and wherein the mapping includes a translating function configured to translate values in the DHCP options to corresponding values in the AAA attributes and to translate in an opposite direction; and generating an AAA request message based on the mapping between the DHCP options and the AAA attributes, wherein the mapping includes port data, access control list data, and an attribute-value (A-V) pair data.

20. An apparatus as recited in claim 19, said step of exchanging DHCP formatted messages further comprising the steps of:

receiving a DHCP request message from a customer node;
authenticating a user of the customer node including the steps of sending a challenge value in a DHCP formatted challenge message, receiving a response value in a DHCP formatted response message, determining whether the response is correct, and if it is determined that the response is correct, then determining that the user is authentic.

21. An apparatus as recited in claim 20, said step of exchanging DHCP formatted messages further comprising the steps of:

if it is determined that the user is authentic, then sending configuration data to the customer node in a DHCPOFFER message, including causing the DHCPOFFER message to be formed based at least in part on the mapping data.

22. An apparatus as recited in claim 20, said step of exchanging DHCP formatted messages further comprising the step of, if it is determined that the user is authentic, then performing the steps of:

determining whether the customer node is connected, including sending a DHCP formatted echo request message, determining whether a corresponding DHCP formatted echo reply message is received within a particular rely time, and if it is determined that a corresponding DHCP formatted echo reply message is not received within the particular reply time, then determining that the customer node is not connected; and if it is determined that the customer node is not connected, then responding to an end of session state with the user of the customer node.

23. An apparatus for communicating configuration data for access to a service provider network, comprising:

a network interface that is coupled to a network for communicating one or more packet flows therewith;

one or more processors;

a computer readable medium; and one or more sequences of instructions stored on the computer readable medium, which, when executed by the one or more processors, causes the one or more processors to carry out the steps of:

receiving mapping data that indicates an association between a plurality of configuration attributes available from an Authentication, Authorization and Accounting (AAA) server for communicating with the service provider network and a different plurality of option types for a Dynamic Host Configuration Protocol (DHCP);

receiving from a customer node a first DHCP request message for configuration data for communications between the customer node and the service provider network;

forming an AAA request message based on the DHCP request message and the mapping data; and sending the AAA request message to the AAA server to obtain values for configuration attributes, wherein the mapping data includes port data, access control list data, and an attribute-value (A-V) pair data.

24. An apparatus as recited in claim 23, wherein execution of the one or more sequences of instructions further causes the one or more processors to carry out the steps of:

in response to sending the AAA request message, receiving an AAA response message that holds data that indicates values for configuration attributes;

forming a DHCPOFFER message based on the AAA response message and the mapping data; and sending the DHCPOFFER message to the customer node.

25. An apparatus as recited in claim 24, wherein execution of the one or more sequences of instructions further causes the one or more processors to carry out the steps of:

determining a value for a particular configuration attribute for a remote access server based on the AAA response; and excluding the particular configuration attribute from the DHCPOFFER message.

26. An apparatus as recited in claim 23, wherein the plurality of option types for DHCP includes a new option type specifically included in a DHCP standard to be associated with an AAA configuration attribute for communications between a customer node on customer premises and the provider network on premises different from the customer premises.

27. An apparatus as recited in claim 26, wherein the new option is a DHCPAUTH-Success option associated with a Remote Authentication Dial-In User Service (RADIUS) successful authentication reply message.

28. An apparatus as recited in claim 26, wherein the plurality of option types for DHCP includes a plurality of new option types specifically including in a DHCP standard so that every AAA configuration attribute for communications between a customer node on customer premises and the provider network on premises different from the customer premises is associated with at least one DHCP option type.

29. An apparatus for communicating configuration data for access to a service provider network, comprising:

a network interface that is coupled to a network for communicating one or more packet flows therewith;

one or more processors;

a computer readable medium; and one or more sequences of instructions stored on the computer readable medium, which, when executed by the one or more processors, causes the one or more processors to carry out the steps of:

receiving mapping data that indicates an association between a plurality of configuration attributes available from an Authentication, Authorization and Accounting (AAA) server for communicating with the service provider network and a different plurality of option types for a Dynamic Host Configuration Protocol (DHCP);

receiving from a customer node a first DHCP request message for configuration data for communications between the customer node and the service provider network;

sending a second DHCP request message based on the first DHCP request message to a DHCP server to obtain values for DHCP option types;

in response to sending the second DHCP request message, receiving a DHCP response message that holds data that indicates values for a plurality of option types;

determining a value for a particular configuration attribute for a remote access server based on the DHCP response message and the mapping data; and configuring the remote access server to communicate with the customer node based on the value for the particular configuration attribute, wherein the mapping data includes port data, access control list data, and an attribute-value (A-V) pair data.

30. An apparatus as recited in claim 29, wherein execution of the one or more sequences of instructions further causes the one or more processors to carry out the steps of:

forming a DHCPOFFER message by stripping from the DHCP response message a DHCP option associated with the particular configuration attribute in the mapping data; and sending the DHCPOFFER message to the customer node.

31. An apparatus as recited in claim 30, wherein the DHCP option associated with the particular configuration attribute is a new option type specifically included in a DHCP standard to be associated with an AAA configuration attribute for a remote access server on a boundary between the provider network on provider premises and an access network, wherein the access network is between the remote access server and a customer node on customer premises different from the provider premises.

32. An apparatus as recited in claim 31, wherein the DHCP option associated with the particular configuration attribute is the DHCP option associated with an attribute that depends on a user of the customer node.

33. An apparatus as recited in claim 31, wherein the DHCP option associated with the particular configuration attribute is the DHCP option associated with a Remote Authentication Dial-In User service (RADIUS) attribute that indicates at least one of a quality of service level and an access control list.

34. An apparatus as recited in claim 29, wherein the plurality of option types for DHCP includes a new option type specifically included in a DHCP standard to be associated with an AAA configuration attribute for communications between a customer node on customer premises and the provider network on premises different from the customer premises.

35. An apparatus as recited in claim 34, wherein the new option is associated with a Remote Authentication Dial-In User Service (RADIUS) attribute associated with a user profile.

* * * * *